(12) United States Patent
Massée

(10) Patent No.: US 6,195,595 B1
(45) Date of Patent: Feb. 27, 2001

(54) APPARATUS FOR WORKING A WORKPIECE, AS WELL AS METHODS TO BE USED WITH SUCH AN APPARATUS

(76) Inventor: Johan Massée, Dynamostraat 4, 3903, LK Veenendaal (NL)

( * ) Notice: Subject to any disclaimer, the term of this patent is extended or adjusted under 35 U.S.C. 154(b) by 0 days.

(21) Appl. No.: 09/025,497

(22) Filed: Feb. 18, 1998

(30) Foreign Application Priority Data

Feb. 20, 1997 (NL) ................................................ 1005318

(51) Int. Cl.[7] .................................................. G06F 19/00
(52) U.S. Cl. ........................................ 700/175; 700/160
(58) Field of Search .................................. 700/175, 176, 700/179, 170, 160, 164, 192, 193, 88; 72/81, 83, 85

(56) References Cited

U.S. PATENT DOCUMENTS

| | | | |
|---|---|---|---|
| 3,605,909 | 9/1971 | Lemelson | 173/3 |
| 4,018,113 | 4/1977 | Blazenin et al. | 294/86.22 |
| 4,722,063 | 1/1988 | Yasukawa et al. | 700/254 |
| 4,807,145 | * 2/1989 | Takahashi et al. | 364/474.17 |
| 5,091,861 | 2/1992 | Geller et al. | 700/192 |
| 5,255,199 | 10/1993 | Barkman et al. | 700/175 |
| 5,363,185 | 11/1994 | Zana | 356/2 |
| 5,387,061 | 2/1995 | Barkman et al. | 409/80 |
| 5,419,222 | * 5/1995 | Bieg | 82/1.11 |
| 5,457,367 | 10/1995 | Thorne | 318/568.11 |
| 5,537,850 | * 7/1996 | Inatani | 72/85 |
| 5,901,595 | * 5/1999 | Massee | 72/81 |
| 5,960,661 | * 10/1999 | Massee | 72/81 |

FOREIGN PATENT DOCUMENTS

| | | |
|---|---|---|
| 40 27 921 A1 | 4/1991 | (DE) . |
| 0 125 720 | 11/1984 | (EP) . |
| 0 470 257 | 2/1992 | (EP) . |
| 60-126709 | 7/1985 | (JP) . |
| 61-195407 | 8/1986 | (JP) . |
| 1-218721 | 8/1989 | (JP) . |

* cited by examiner

Primary Examiner—William Grant
Assistant Examiner—Kidest Bahta
(74) Attorney, Agent, or Firm—Westman, Champlin & Kelly, P.A.; S. Koehler, Esq.

(57) ABSTRACT

An apparatus for working a workpiece comprises drive means for rotating a carrier about an axis of rotation and a tool for working the workpiece. The apparatus furthermore comprises means for moving said tool in an x-direction and a y-direction with respect to the drive means, and a control unit comprising a memory for one or more control programs. The control unit is arranged for controlling the moving means in accordance with a control program, in such a manner that the tool will follow one or more desired paths for working the workpiece. The control unit is furthermore arranged for measuring an apparatus parameter which influences the control program, such as the angle between the axis of rotation and one of the moving means and/or the tool contour and the position of said contour with respect to the axis of rotation. Said apparatus parameter(s) is (are) stored at the (each) control program in the memory. If a difference is detected between the stored apparatus parameter(s) and the measured one(s), the (each) control program is adapted so that the tool will still follow the desired path(s).

14 Claims, 8 Drawing Sheets

APPARATUS FOR WORKING A WORKPIECE, AS WELL AS METHODS TO BE USED WITH SUCH AN APPARATUS

BACKGROUND OF THE INVENTION

The invention relates to an apparatus for working a workpiece, which apparatus comprises drive means for rotating a carrier about an axis of rotation, a tool for working said workpiece, means for moving said tool in an x-direction and a y-direction with respect to said drive means, and a control unit comprising a memory for one or more control programs, wherein said control unit is arranged for controlling said moving means in accordance with a control program, in such a manner that said tool follows one or more desired paths for working the workpiece, and also to a method for storing a control program for such an apparatus and to a method for controlling such an apparatus.

Apparatus of the above kind are known in various embodiments thereof, and they may be adapted for working the workpiece, whether or not by removing stock. Known apparatus are for example lathes, forming lathes or the like. Usually a control program is stored in the memory in a teaching or programming phase in the known apparatus, after which the control unit controls the moving means in accordance with the control program in the production phase, so that the tool is moved in the desired path or paths along the workpiece, which is clamped in the apparatus, so as to carry out the desired working step on the workpiece. One problem that occurs with known apparatus is that when the tool is exchanged or worked, the tool contour and/or the position of said contour with respect to the axis of rotation no longer correspond with the contour and/or the position of the tool during the teaching or programming phase, in particular if the tool must be adjusted in advance outside the apparatus. Another problem is that when maintenance or repairs are being carried out on the apparatus, whereby the moving means are for example detached from the frame of the apparatus, it is virtually impossible to fix the moving means in exactly the same position in the apparatus again. In such cases a change actually occurs in one or more apparatus parameters that influence the control program, as a result of which the stored program can no longer be used. In that case it will be necessary to store the control program for the product in question in the memory anew in a teaching or programming phase.

In the mass production of large numbers of identical products, several apparatus of the above kind will usually produce the same workpiece. With the known apparatus a control program must be stored in the memory in a teaching or programming phase for each apparatus separately. This makes it virtually impossible to achieve an exactly synchronized same production time for all apparatus which produce the same product. This is a drawback, in particular if the worked workpieces from two or more apparatus must subsequently undergo further working in a common subsequent apparatus.

SUMMARY OF THE INVENTION

The object of the invention is to provide an apparatus of the kind referred to in the introduction, wherein the above drawbacks have been overcome in a simple and efficient manner.

In order to accomplish that objective the apparatus according to the invention is characterized in that the control unit is arranged for measuring at least one apparatus parameter, which apparatus parameter is stored at the (each) control program, wherein the control unit is arranged for comparing the stored apparatus parameter with the measured apparatus parameter, and wherein the control unit, if a difference is detected between the stored apparatus parameter(s) and the measured one(s), adapts the (each) control program in such a manner that the tool will follow the desired path(s).

The invention is based on the insight that by storing the apparatus parameters, such as the angle between the axis of rotation and one of the directions of movement, and/or the tool contour and the position of said contour with respect to the axis of rotation, in the control programme, said control programme is in fact made independent of said parameters. By having the control unit measure these parameters before a workpiece is worked in accordance with a control program, the control unit can establish the difference between the values stored at the control program in question and the measured values, and, if a difference is detected, adapt the control program so that the tool will follow the desired path or paths in spite of any such deviation. This means that a new teaching or programming phase for continuing the production in accordance with an already stored control program is no longer necessary when the tool is exchanged or worked. In addition, a control program which has been stored in a particular apparatus in a teaching or programming phase together with the associated apparatus parameter(s), can be used in other apparatus without any problem, whereby said control program can be adapted to the apparatus in question in a simple manner by having the control unit measure the apparatus parameter(s). All of the apparatuses will then have the same production time. Moreover, a teaching or programming phase is only required for one apparatus, after which the control program can be used for all other apparatuses which are used for producing the same product.

Another advantage of the apparatus according to the invention is furthermore the fact that a user of the apparatus can order a control program for the manufacture of a particular product from the manufacturer or from another supplier, which program can be stored in a teaching or programming phase on an available machine by the supplier, and subsequently be made available to the user.

Consequently the invention also provides a method for storing a control program for an apparatus for working a workpiece, which apparatus comprises drive means for rotating a carrier about an axis of rotation, a tool for working the workpiece, means for moving said tool with respect to said drive means in an x-direction and a y-direction, and a control unit comprising a memory for one or more control programs, wherein a working step is carried out on the workpiece in a teaching or programming phase, and one or more paths followed by the tool during the working of the workpiece are stored in the memory in the form of a control program for said moving means, characterized in that at least one apparatus parameter, preferably the angle between the axis of rotation and one of the directions of movement and/or the tool contour and the position of said contour with respect to the axis of rotation, is measured and stored in the memory.

The invention furthermore provides a method for controlling an apparatus for working a workpiece, which apparatus comprises drive means for rotating a carrier about an axis of rotation, a tool for working the workpiece, means for moving said tool with respect to said drive means in an x-direction and a y-direction, and a control unit comprising a memory for storing one or more control programs and at least one apparatus parameter, wherein said control unit is arranged for controlling said moving means in accordance with a control program, in such a manner that said tool follows one or more desired paths for working the workpiece, characterized in that at least one apparatus parameter is measured and compared with the stored apparatus parameter, and if a difference is detected between the stored apparatus parameter and the measured one, the (each) control program is adapted in such a manner that the tool will follow the desired path(s), whereby preferably the angle between the axis of rotation and one of the directions of movement and/or the tool contour and the position of said contour with respect to the axis of rotation are used as the apparatus parameters.

BRIEF DESCRIPTION OF THE DRAWINGS

The invention will be explained in more detail hereafter with reference to the drawing, which diagrammatically shows a few embodiments of the apparatus according to the invention.

DETAILED DESCRIPTION OF THE PREFERRED EMBODIMENTS

Figure 1:
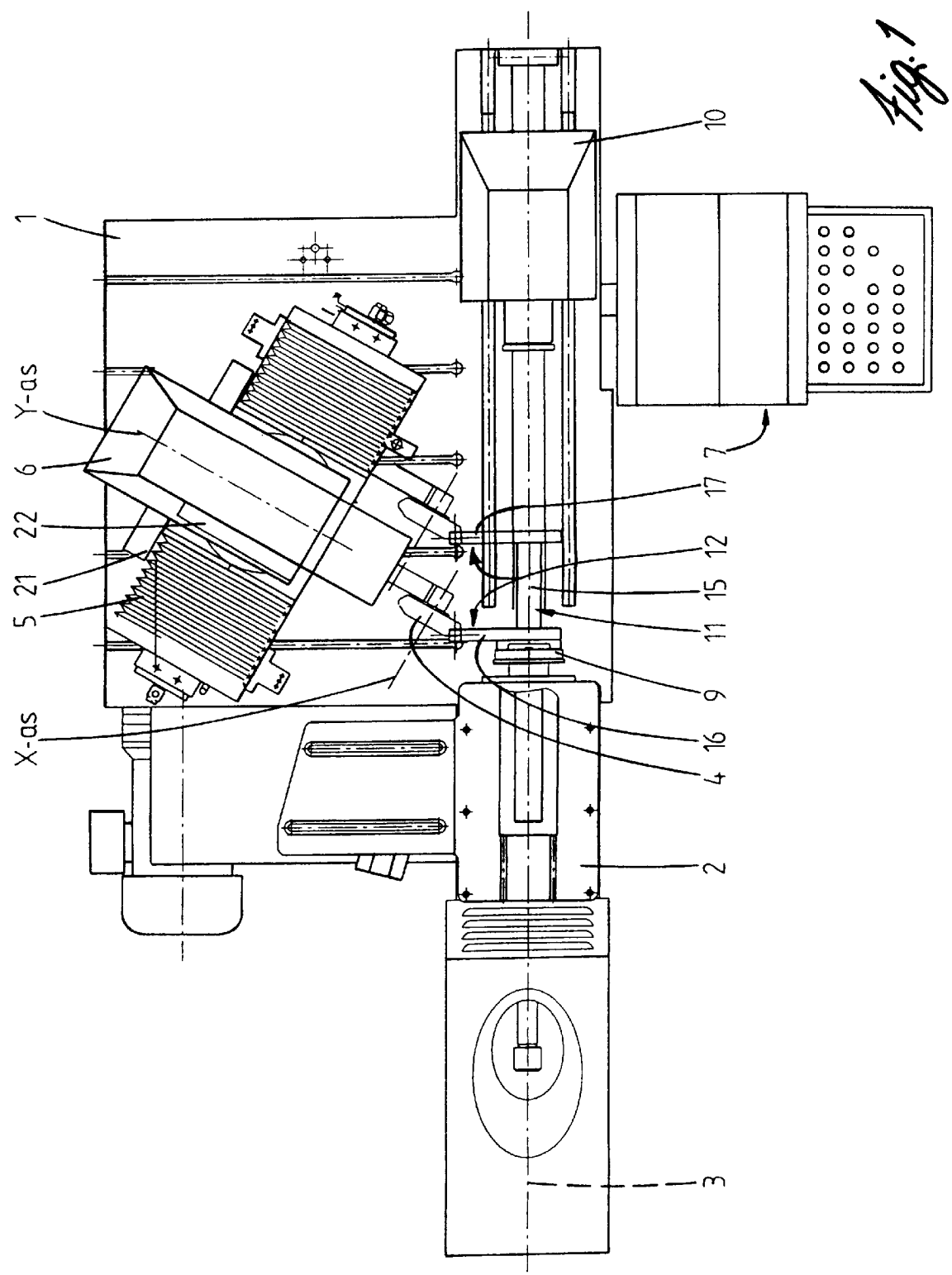
FIG. 1 is a plan view of a first embodiment of the apparatus according to the invention.
Figure 2:
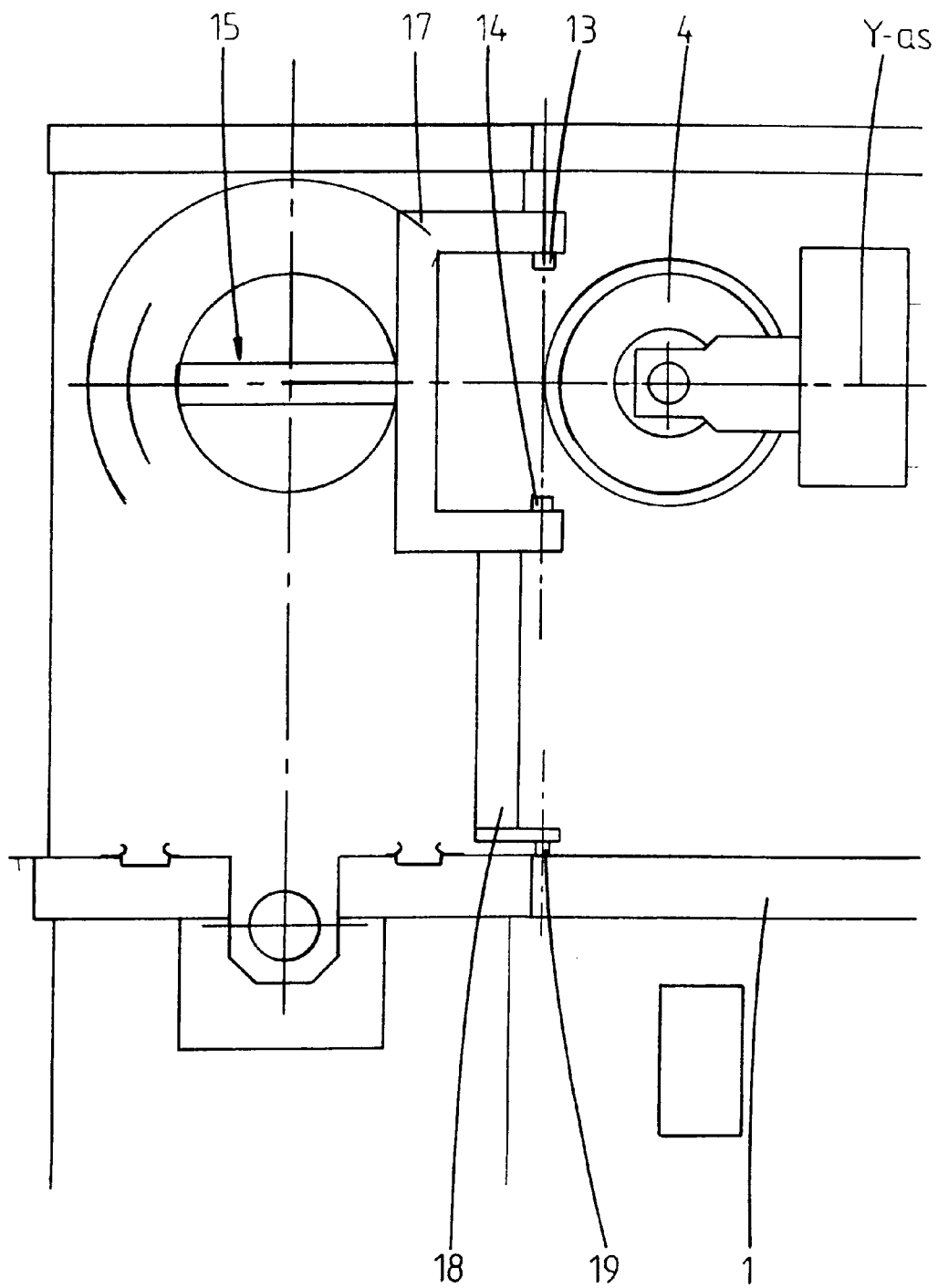
FIG. 2 is a very diagrammatic, larger-scale front view of a part of the apparatus of FIG. 1.

FIG. 1 is a plan view of a forming machine which comprises a machine bed 1, a drive unit 2 for rotating a workpiece (not shown) about an axis of rotation 3, a forming roller 4 for working the workpiece, and means 5, 6 for moving forming roller 4 in an x-direction and a y-direction with respect to drive unit 2. Said moving means 5, 6 comprises a bedslide 5, which is capable of movement in x-direction, and a top slide 6, which is capable of movement in y-direction on said bedslide 5 and which supports forming roller 4. The x and y-directions or axes extend perpendicularly to each other in this embodiment, but this is not necessary.

Figure 8:
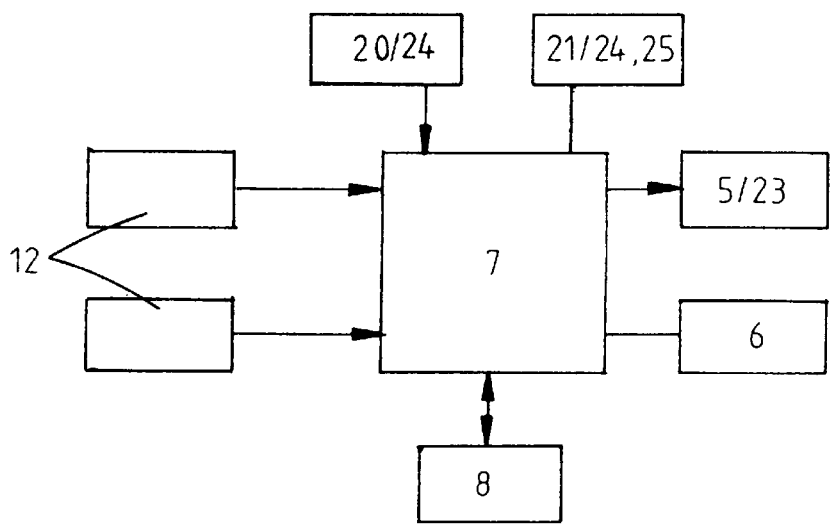
FIG. 8 is a simplified block diagram of the control unit of the apparatus of FIGS. 1 and 3.

A control unit 7, which is shown in a strongly simplified block diagram in FIG. 8, is arranged for controlling moving means 5, 6 in accordance with a control program stored in a memory 8, in such a manner that forming roller 4 follows one or more desired paths for transforming the workpiece into the desired product or semi-finished product. The forming machine that has been discussed so far is known per se, it is described in the applicant's EP-A-0 125 720, and the construction and operation of this machine will not be discussed in detail herein. For a more detailed explanation reference is made to EP-A-0 125 720.

Figure 9:
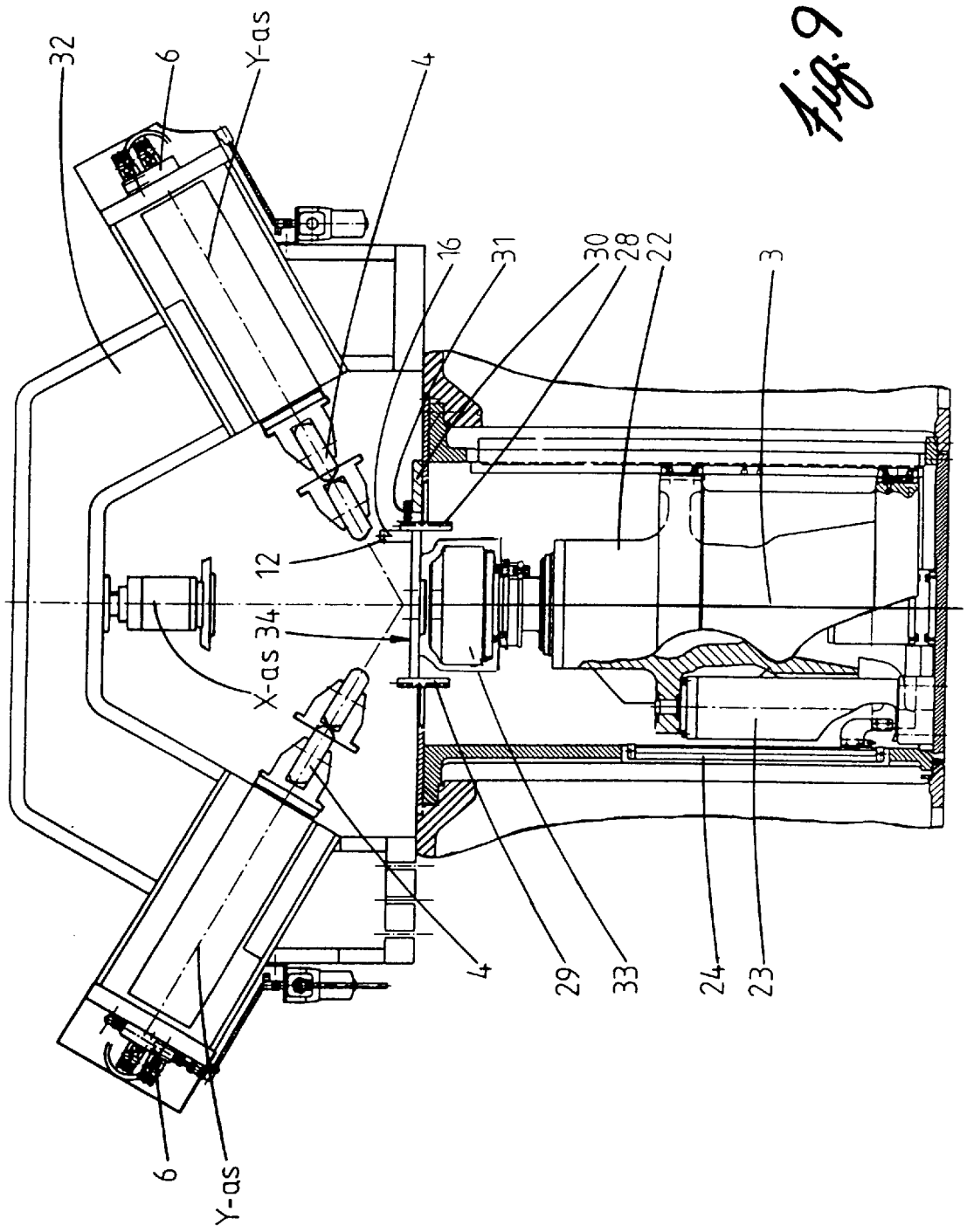
FIG. 9 is a cross-sectional view corresponding with FIG. 3 of the apparatus according to the invention, wherein a forming tool is mounted on the carrier of the drive means, and wherein an alternative measuring unit is mounted on said forming tool.

Drive unit 2 is provided with a rotary carrier 9, on which a forming tool is mounted during normal operation, on which the workpiece, which for example consists of a metal sheet, which may or may not be preformed, is transformed. Reference is made to FIG. 9, which shows an embodiment of the apparatus with a forming tool being mounted on carrier 9. This embodiment will be discussed in more detail hereafter.

The workpiece is clamped against the forming tool mounted on carrier 9 by means of a chuck unit 10, in order to be transformed. Control unit 7 will then control moving means 5, 6, in such a manner that the workpiece is transformed as a result of forming roller 4 following one or more paths on the forming tool. The control program required for this operation is stored in memory 8 in a teaching or programming phase. Among other things said control program comprises the x and y-positions of forming roller 4, on the basis of which moving means 5, 6 are controlled by control unit 7. It will be apparent that by controlling the moving means 5, 6 along the indicated x and y-axes, forming roller 4 can be moved along any desired path along axis of rotation 3.

When moving means 5, 6 must be removed from machine bed 1, for example for maintenance or repairs, is virtually impossible in practice to mount moving means 5, 6 onto machine bed 1 again in such a manner that the x or y-direction will include exactly the same angle with axis of rotation 3 again. The consequence of a deviation of this angle from the angle at which the control program was stored in the teaching or programming phase, however, is that forming roller 4 will no longer follow the desired paths if the same control program is maintained. With the known forming machine the control program must be stored anew in a teaching or programming phase.

A similar drawback occurs with the known forming machine when forming roller 4 is to be exchanged or worked, since the contour and/or the position of said contour with respect to axis of rotation 3 will no longer correspond with the contour and/or the position stored during the teaching or programming phase. The aforesaid angle and contour and/or position are in fact apparatus parameters which influence the control program.

With the forming machine according to the invention the existing control program may be maintained, in spite of the fact that the apparatus parameter(s) has (have) changed, since control unit 7 is arranged for measuring one or more of these parameters. The parameter(s) is (are) stored at the control program in memory 8 during the teaching or programming phase. In the event of parameters being changed by maintenance work or by another cause, said parameters will be measured anew and be compared with the parameters that are stored in the memory. If there appears to be a difference between a recorded parameter and the measured value, control unit 7 will adapt the control program in question, in such a manner that forming roller 4 will follow the desired paths all the same.

In the above-described embodiment the forming machine comprises a measuring unit 11, by means of which the control unit 7 can measure the angle between axis of rotation 3 and the y-direction. In the illustrated embodiment measuring unit 11 includes two measuring elements 12, which each comprise a laser diode 13 and a receiver 14. Measuring unit 11 comprises a mounting unit 15, which is fixed to carrier 9 and which has two U-shaped supporting arms 16, 17, which each support a diode-receiver pair 13, 14. Mounting unit 15 furthermore comprises an adjusting arm 18, which is supported on machine bed 1 with an adjusting element 19, whereby adjusting element 19 is adjusted such that the light beam of diode 13 extends exactly perpendicularly to the plane in which axis of rotation 3 and the y-axis lie.

If adjusting element 19 of measuring unit 11 is correctly adjusted, the control unit 7 will control moving means 5, 6 in such a manner that the circumference of the forming roller 4 which is used in this example will be scanned carefully by measuring element 12 of the first U-shaped arm 16, whereby the control unit will store the x and y-positions of moving means 5, 6 that are associated with one or more predetermined points on said circumference, preferably the highest point or several points of forming roller 4. Then the control unit will move forming roller 4 to measuring element 12 of second U-shaped arm 17, which position is schematically illustrated in FIG. 1. Control unit 7 will then control moving means 5, 6 again, so that the measuring element in question of arm 17 will scan the circumference of forming roller 4 and store the x and y-positions of the same point or points. Since the control unit 7 will establish the movement of moving means 5, 6 in a usual manner, by means of measuring elements 20, 21, the control unit can simply calculate the angle between the x or y-direction and axis of rotation 3 from the two different x and y-positions of the predetermined point of forming roller 4. This angle will be stored in memory 8 at the control program which is stored in said memory 8 in the teaching or programming phase.

When the forming machine is subsequently prepared for a production phase with the forming tool in question, control unit 7 will first measure the angle between axis of rotation 3 and the x or y-direction in the above-described manner, and compare said angle with the angle stored at the control program in question. If a difference is detected between the stored angle and the measured angle, control unit 7 can adapt the x and y-positions of moving means 5, 6 to the changed angle in a simple manner, so that the stored control program can be used in spite of a change in said angle.

This adaptation may for example take place by converting the x and y-positions angle into orthogonal positions with respect to axis of rotation 3 on the basis of the angle that has been measured in the teaching or programming phase. Then said orthogonal positions are converted back into corrected x and y-positions for moving means 5, 6 again on the basis of the changed angle, wherein the changed angle is stored for any future corrections in case changes in the angle should occur again.

The above-described apparatus and method also have the advantage that the control program which has been stored in a teaching or programming phase on a first forming machine can be simply used with another forming machine having comparable settings in a particular production phase, because a control unit of this other forming machine will first measure the angle between the axis of rotation and the x or y-direction again, and if a difference is detected between the measured angle and the stored angle, the control unit can adapt the control program to the associated forming machine. This is a significant advantage, since only one control program needs to be stored in a teaching or programming phase in the case of mass production with several forming machines, after which this control program can be used on all forming machines. Another advantage that is achieved thereby is the fact that the production time will be exactly the same for all forming machines.

Finally the above-described method and apparatus have the advantage that a supplier can make a control program and make this program and a forming tool available to customers.

Although only one forming tool is used in the above-described forming machine according to FIG. 1, it is also possible, for example, to use the invention with other types of forming machines, wherein moving means 5, 6 with respective associated forming rollers are disposed at more than one location around the axis of rotation 3.

Figure 3:
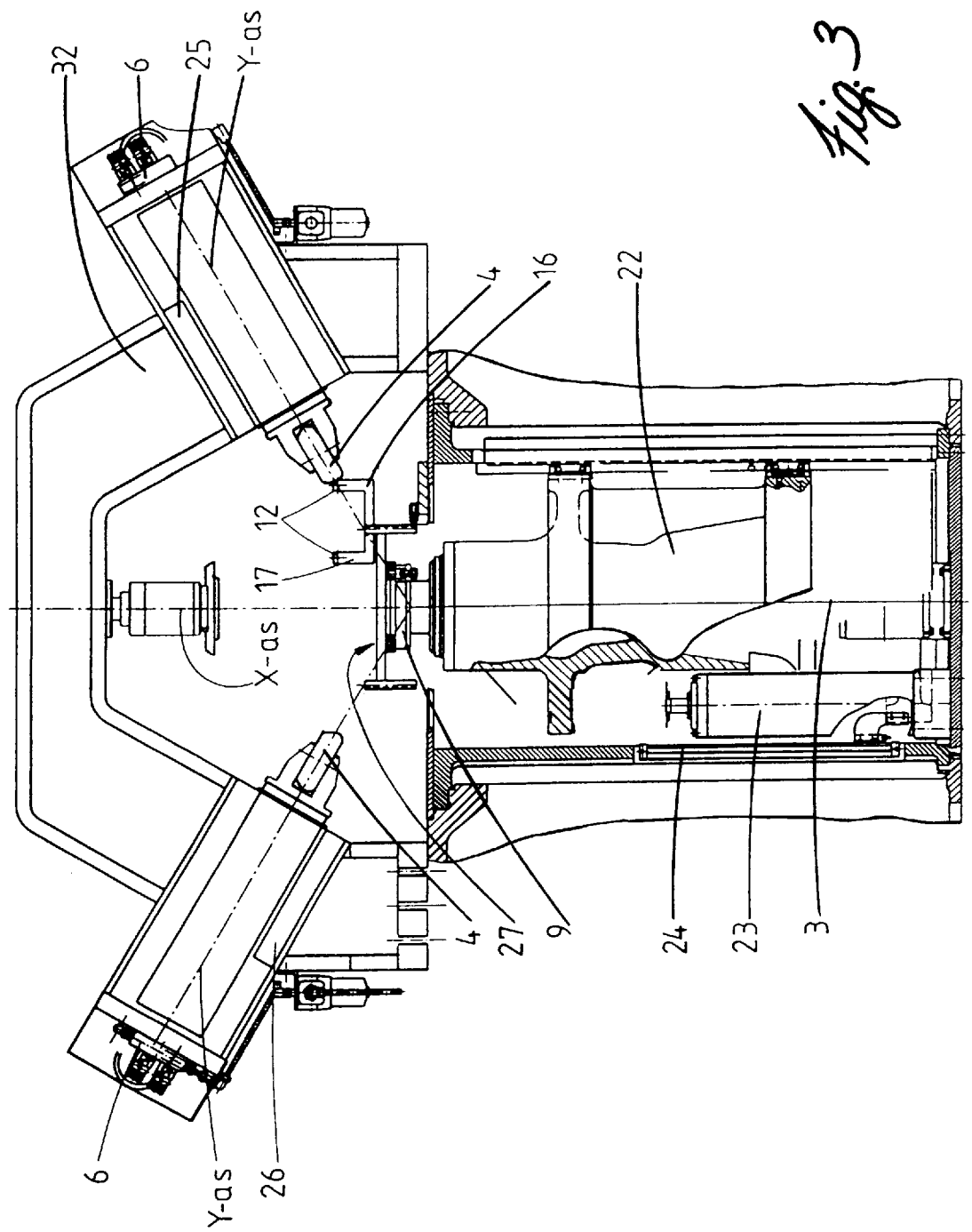
FIG. 3 is a diagrammatic cross-sectional view of a second embodiment of the apparatus according to the invention, which shows the measuring unit is a first position thereof.

FIG. 3 shows a second embodiment of the apparatus according to the invention, which is described in more detail in the applicant's patent application of the same date, to which reference may be had for a more detailed description. In said forming machine a drive unit 22 can be moved in the direction of axis of rotation 3, which extends in horizontal direction in this case, by means of a hydraulic cylinder 23, whereby the movement is measured by a measuring element 24. The movement of drive unit 22 in the direction of axis of rotation 3 corresponds with the movement of the bedslide in the y-direction in the forming machine of FIG. 1. In this case two forming rollers 4 are disposed on either side of axis of rotation 3, whereby the forming rollers are only capable of movement in y-direction by means of an associated moving means 6. The movement of forming rollers 4 in the x-direction is measured by measuring elements 25, 26.

The operation of the forming machine shown in FIG. 3 corresponds with the operation of the forming machine of FIG. 1. With the forming machine according to FIG. 3 a measuring unit 11 comprising two measuring elements 12 is used again, which measuring elements are disposed on U-shaped arms 16 and 17. The measuring unit 11 of the forming machine shown in FIG. 3 possesses another mounting unit 27, which can be mounted on rotary carrier 9 of drive unit 22. FIG. 3 shows drive unit 22 in a first position thereof, in which position the circumference of forming roller 4 can be scanned by means of measuring element 12 of U-shaped arm 16, all this under the control of control unit 7, which controls moving means 6, 23. Said scanning makes it possible to determine the x and y-positions of one or more points on the circumference of forming roller 4, preferably at least the highest point. Then drive unit 22 is moved downwards to the position shown in FIG. 5. In this position the circumference of forming roller 4 can be scanned with the measuring element 12 of U-shaped arm 17. In this position of drive unit 22 the x and y-positions of the same point on forming roller 4 are determined. On the basis of the movement in the x and y-directions, control unit 7 can determine the angle between the y-direction and axis of rotation 3, which coincides with the x-direction in this embodiment, and store it in the above-described manner at the control program and/or compare it with the stored angle. In case of a difference the control program can be adapted again, as a result of which the above-described advantages will be obtained.

Figure 4:
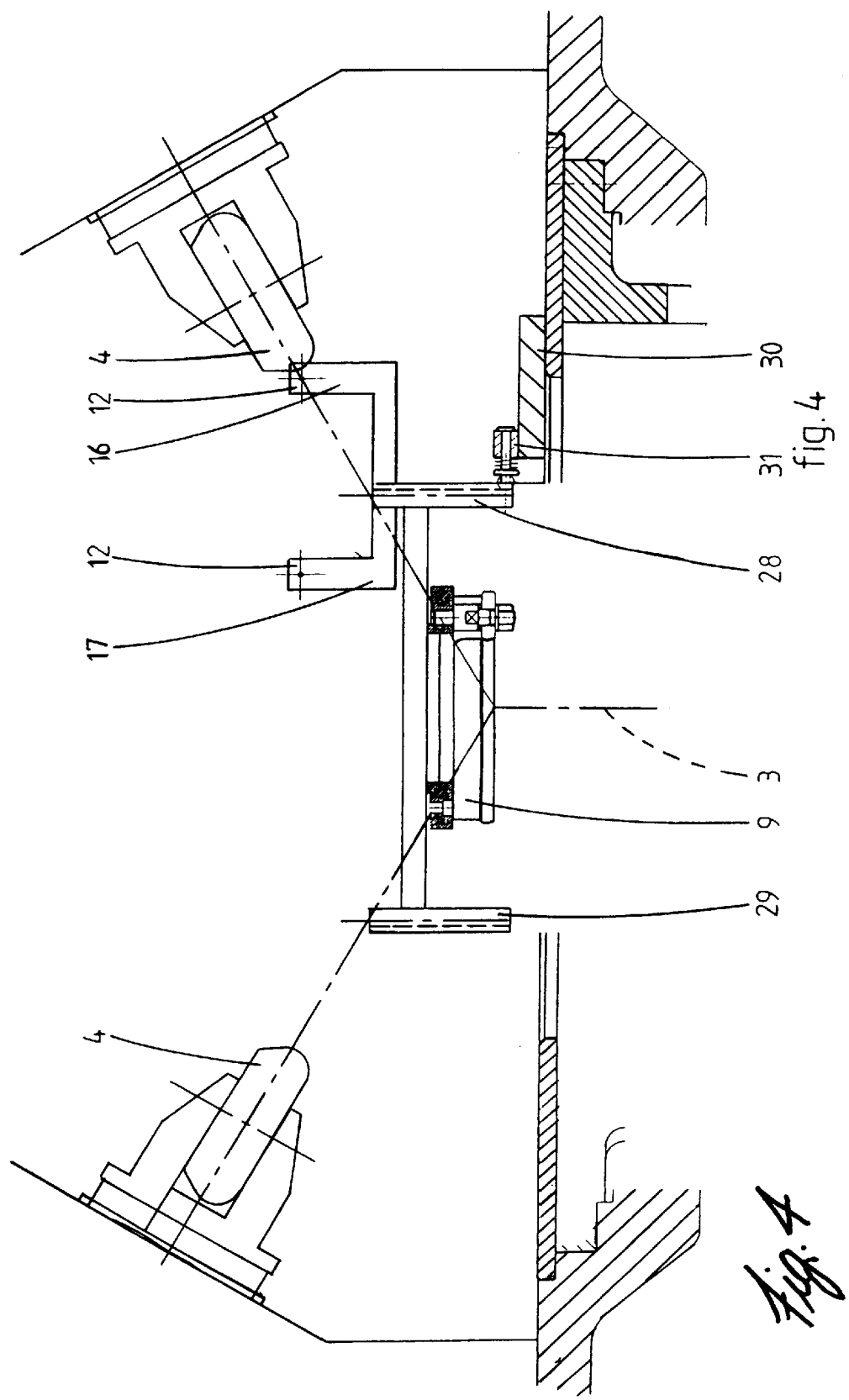
FIG. 4 shows part of the cross-sectional view of FIG. 3 on a larger scale.
Figure 6:
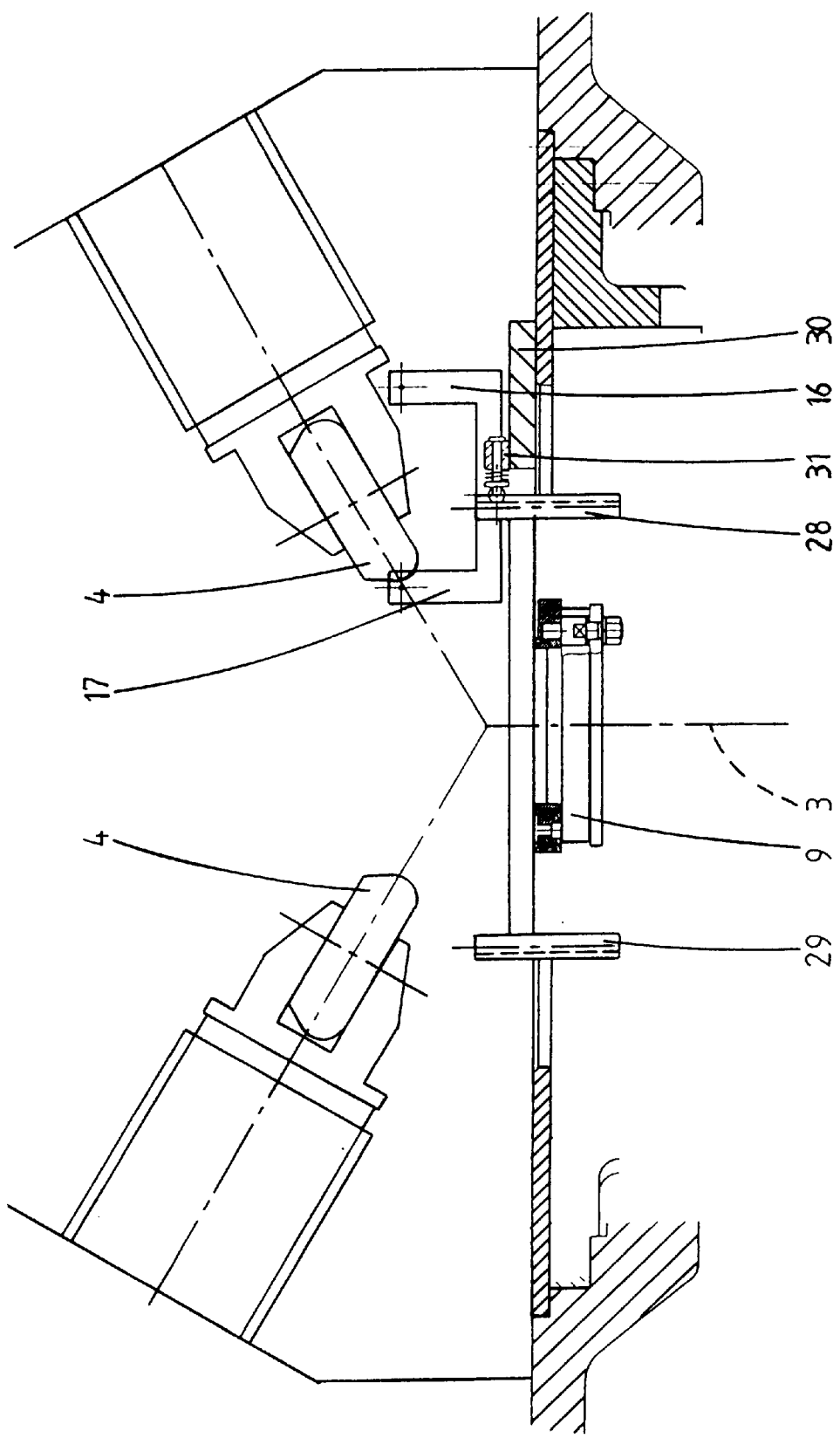
FIG. 6 shows part of the cross-sectional view of FIG. 5 on a larger scale.
Figure 7:
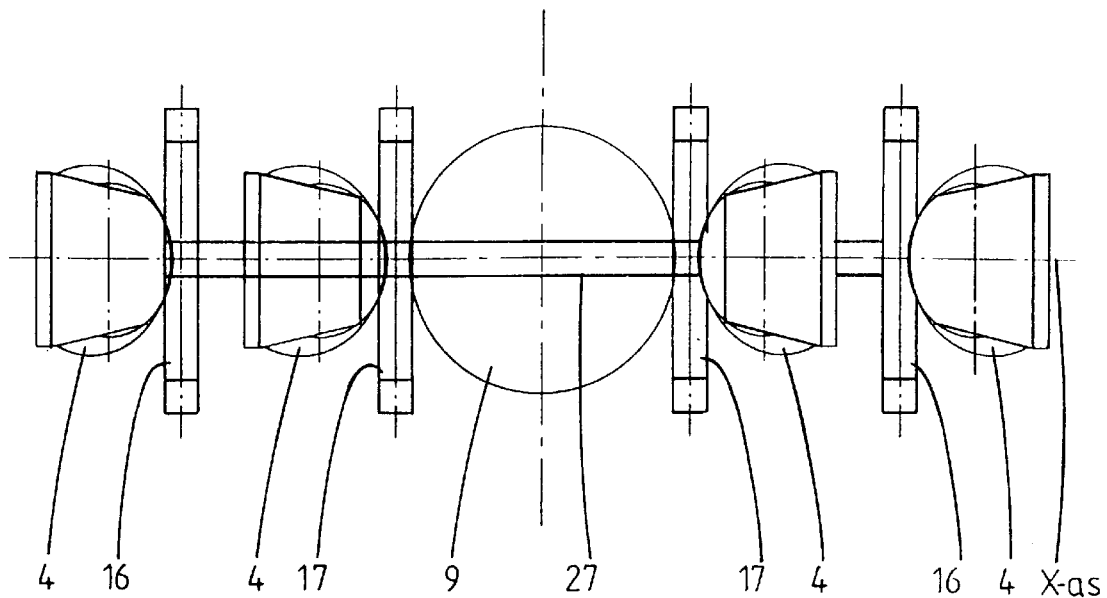
FIG. 7 is a plan view of the part of the apparatus shown in FIGS. 4 and 6, wherein the measuring unit and the tools are shown in different positions thereof.

As shown in the larger-scale partial sections shown in FIGS. 4 and 6, mounting unit 27 comprises two diametrically opposite adjusting arms 28, 29, which are capable of cooperation with a stop member 31, which is mounted on a frame part 30. FIG. 7 is a schematic plan view of the part shown in FIGS. 4 and 6, wherein the forming roller present on either side of axis of rotation 3 is shown in two different positions thereof, and wherein also measuring elements 12 are shown in two different positions thereof. From this plan view it appears that the adjusting arms 28, 29 cooperate with the stop member 31 in such a manner that the light beam of diode 13 extends perpendicularly to the common plane of the axis of rotation and the x-direction. This helps to prevent measuring errors.

Figure 5:
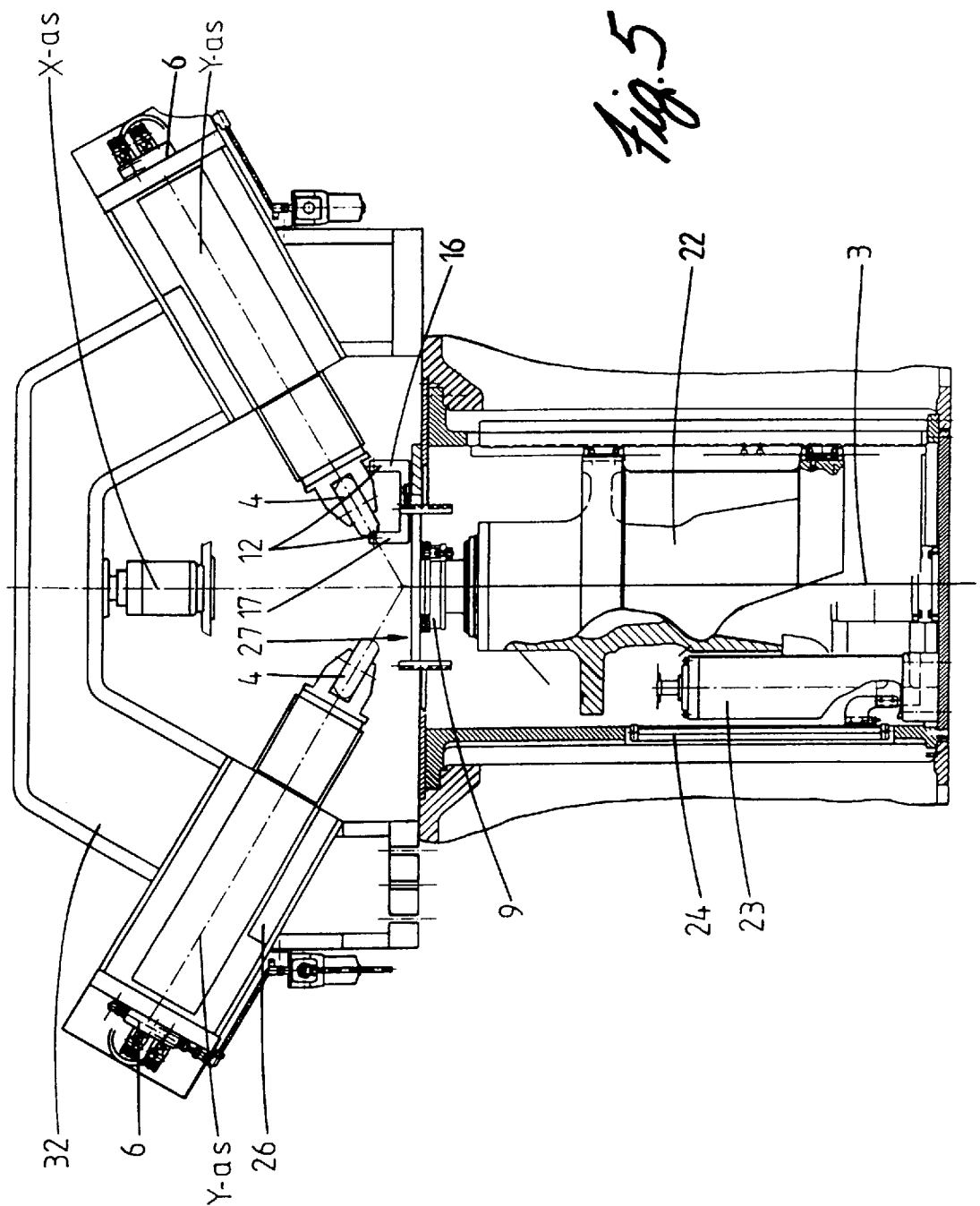
FIG. 5 is a cross-sectional view which corresponds with FIG. 3, which shows the second measuring unit in a second position thereof.

From FIGS. 3 and 5 it appears that the moving means 6 of the two forming rollers 4 are mounted on a carrier beam 32, which is fixed to the frame of the forming machine in a manner which is not shown. Said carrier beam 32 also carries a clamping unit 10 (not shown), by means of which a workpiece to be worked can be clamped against a forming tool to be mounted on carrier 9.

FIG. 9 shows an embodiment of the forming machine according to FIGS. 3 and 5, wherein a forming tool 33 is mounted on carrier 9 of drive unit 22. Mounted on said forming tool 33 is a measuring unit 34, which comprises a measuring element 12, which, as described above, consists of a laser diode and a receiver, which are carried by a U-shaped arm 16. Two adjusting arms 28 are disposed in diametrically opposite relationship in the same manner as with measuring unit 11, which adjusting arms are capable of cooperation with the stop member 31 mounted on frame part 30. This makes it possible to lock measuring unit 34 in a measuring position for measuring the contour and the position of forming rollers 4 shown on the right and on the left in the sectional view according to FIG. 9. In both measuring positions the light beam of the laser diode extends perpendicularly to the common plane of axis of rotation 3 and the y-axis. Control unit 7 can move forming roller 4 and drive unit 22 with respect to each other by controlling hydraulic cylinder and the respective moving means 6, in such a manner that measuring element 12 of measuring unit 34 will scan the contour of forming roller 4, which contour is stored in memory 8 in the form of x and y-positions. The x and y-position(s) that have been stored by means of measuring unit 34 may be considered as zero point(s) for the teaching or programming phase.

When forming roller 4 is exchanged and/or worked or when forming tool 33 is exchanged after one or more control programs have been stored, measuring unit 34 is first mounted on forming tool 33 again before the control program is executed in the production phase, after which the contour of forming roller 4 is scanned again. The x and y-position obtained thereby, which may be considered as zero point(s) for the reproduction phase, are compared by control unit 7 with the x and y-positions which are stored in memory 8, and if differences are detected, control unit 7 will adapt the control program, so that the correct path/paths will be travelled by the forming roller in spite of changes in the contour and/or the position of forming roller 4 or in the position of the front surface of forming tool 33. This adaptation can be achieved in a simple manner in this case, for example by correcting the x and y-positions of moving means 5, 6 for each point of the path/paths stored in the memory in dependence on the differences that have been measured.

It is noted that the forming machine according to FIGS. 3 and 9 may also comprise more than two forming rollers, whereby the measuring unit may have one adjusting arm for each forming roller. Of course it is also possible to use only one arm, and to provide a stop member 31 at several positions round the axis of rotation.

Although the invention has been explained by means of a forming machine in the above, the invention may also be used with other types of apparatus for working a workpiece, for example with a lathe. It is noted that it is also possible to use other types of measuring elements than the above-described measuring elements 12 comprising a laser diode and a receiver, for example mechanical, electronic, electromagnetic, photographic or optical measuring means, or measuring means that operate acoustically or pneumatically.

Accordingly the invention is not limited to the embodiments described above, which can be varied in various ways within the scope of the claims.

I claim:

1. An apparatus for working a workpiece, which apparatus comprises drive means for rotating a carrier about an axis of rotation, a tool for working said workpiece, means for moving said tool in one or more directions with respect to said drive means, and a control unit comprising a memory for a control program, wherein said control unit is arranged for controlling said moving means in accordance with the control program, in such a manner that said tool will follow a desired path for working the workpiece, wherein the control unit is arranged for measuring at least the angle between the axis of rotation and one of the moving means of the apparatus as an apparatus parameter, wherein the control unit is arranged for comparing the stored apparatus parameter with the measured apparatus parameter, and wherein the control unit, if a difference is detected between the stored apparatus parameter and the measured apparatus parameter, adapts the control program in such a manner that the tool will follow the desired path.

2. The apparatus according to claim 1, and further comprising a measuring unit for measuring at least one predetermined point on the circumference of the tool in a first and a second position with respect to the axis of rotation, wherein the control unit controls the moving means for moving the tool with said predetermined point to said first and said second position, wherein the control unit determines a distance which the tool travels in x and y-directions, and wherein the control unit determines said angle between the axis of rotation and one of the moving means on the basis of said distance.

3. The apparatus according to claim 1, wherein the measuring unit comprises a first and a second measuring element for measuring at least said predetermined point in the first and the second position.

4. The apparatus according to claim 1, wherein the measuring unit can be coupled to the carrier of the drive means.

5. The apparatus according to claim 1, wherein the control unit is arranged for measuring a contour of the tool and a position of said contour with respect to the axis of rotation as apparatus parameters.

6. The apparatus according to claim 5, wherein said measuring unit can be coupled to the carrier of the drive means, wherein the control unit controls the moving means so that a measuring element of the measuring unit will scan the tool contour, wherein the control unit determines associated x and y-positions and compares them with x and y-positions that are stored in the memory.

7. The apparatus according to claim 2, wherein said measuring unit comprises adjusting means for adjusting a measuring position of the measuring unit with respect to a common plane of the axis of rotation and one of the directions of movement.

8. The apparatus according to claim 7, wherein said adjusting means comprise an adjusting arm, which cooperates with a machine bed.

9. The apparatus according to claim 7, wherein two or more tools for working the workpiece and moving means for each tool are provided, wherein said adjusting means comprise an adjusting arm for each tool, which cooperates with a stop member mounted on at least one of a frame part of the apparatus and a frame part for each tool, the stop member being capable of cooperation with an adjusting arm of said adjusting means.

10. The apparatus according to claim 7, wherein each measuring element includes a laser diode and a receiver, wherein a light beam of the laser diode extends perpendicularly to said common plane in the measuring position.

11. The apparatus according to claim 2, wherein the apparatus is a forming machine.

12. The apparatus according to claim 11, wherein a forming tool is fixed on the carrier of the drive means, and wherein said measuring unit can be mounted on said forming tool.

13. A method for storing a control program for an apparatus for working a workpiece, which apparatus comprises drive means for rotating a carrier about an axis of rotation, a tool for working the workpiece, means for moving said tool with respect to said drive means in an x-direction and a y-direction, and a control unit comprising a memory for one or more control programs, wherein a working step is carried out on the workpiece in a teaching or programming phase, and one or more paths followed by the tool during the working of the workpiece are stored in the memory in the form of a control program for said moving means, wherein at least the angle between the axis of rotation and one of the directions of movement is measured and stored in the memory.

14. A method for controlling an apparatus for working a workpiece, which apparatus comprises drive means for rotating a carrier about an axis of rotation, a tool for working the workpiece, means for moving said tool with respect to said drive means in one or more directions, and a control unit comprising a memory for storing one or more control programs and at least one apparatus parameter, wherein said control unit is arranged for controlling said moving means in accordance with a control program, in such a manner that said tool will follow one or more desired paths for working the workpiece, the method comprising, measuring the apparatus parameter and comparing the measured apparatus parameter with the stored apparatus parameter, and if a difference is detected between the stored apparatus parameter and the measured one, adapting the control program in such a manner that the tool will follow the desired path(s), wherein at least the angle between the axis of rotation and one of the directions of movement is used as an apparatus parameter.

* * * * *